(12) United States Patent
Alberi-Morel et al.

(10) Patent No.: US 8,934,469 B2
(45) Date of Patent: Jan. 13, 2015

(54) OPTIMIZED METHOD OF TRANSMITTING LAYERED CONTENTS TO MOBILE TERMINALS AND VIA A RADIO INFRASTRUCTURE WITH ACCESS PROCEDURE OF TDM/TDMA/OFDMA TYPE, AND ASSOCIATED PROCESSING DEVICE

(75) Inventors: Marie Line Alberi-Morel, Nozay (FR); Carine Balageas, Nozay (FR); Vinod Kumar, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 839 days.

(21) Appl. No.: 12/739,198

(22) PCT Filed: Oct. 20, 2008

(86) PCT No.: PCT/FR2008/051887
§ 371 (c)(1),
(2), (4) Date: Dec. 22, 2011

(87) PCT Pub. No.: WO2009/053663
PCT Pub. Date: Apr. 30, 2009

(65) Prior Publication Data
US 2012/0093144 A1    Apr. 19, 2012

(30) Foreign Application Priority Data

Oct. 22, 2007   (FR) ...................... 07 58458

(51) Int. Cl.
*H04J 3/00* (2006.01)
*H04L 29/06* (2006.01)

(52) U.S. Cl.
CPC .............. *H04L 65/604* (2013.01); *H04L 65/80* (2013.01)
USPC ....................................................... 370/345

(58) Field of Classification Search
None
See application file for complete search history.

(56) References Cited

U.S. PATENT DOCUMENTS

| 7,725,799 | B2 * | 5/2010 | Walker et al. ................. 714/755 |
| 2005/0129018 | A1 * | 6/2005 | Casaccia et al. .............. 370/390 |
| 2009/0094024 | A1 * | 4/2009 | Yamanashi et al. ........... 704/219 |

FOREIGN PATENT DOCUMENTS

| EP | 1 359 782 A | 11/2003 | |
| WO | WO 2005/039186 A | 4/2005 | |
| WO | WO 2007105586 A1 * | 9/2007 | .............. G10L 19/14 |

OTHER PUBLICATIONS

International Search Report.

*Primary Examiner* — Mohamed Wasel
*Assistant Examiner* — Tsung Wu
(74) *Attorney, Agent, or Firm* — Fay Sharpe LLP (57) ABSTRACT

A method is devoted to the transmission, via a wave-based transmission infrastructure (RC) using an access method relying on multiplexing that is at least time division multiplexing, of content from at least one channel, each piece of content being arranged into one base data layer and at least one enhancement data layer, respectively associated with different transmission time slices, and broken down into portions transmitted during the time slices respectively associated with their layers. This method comprises i) the insertion, in a chosen location of each portion of a base data layer to be transmitted, within a chosen network layer, of at least one learning sequence processed according to a configuration scheme identical to that used to process the enhancement data layer, and ii) upon receiving a portion of a base data layer of a piece of content within a terminal (TC), extracting the learning sequence inserted into a chosen network layer, then estimating the reception quality based on that extracted learning sequence, and allowing it to use the next portion of the content's the enhancement data layer whenever the estimated quality is above a chosen threshold.

19 Claims, 1 Drawing Sheet

OPTIMIZED METHOD OF TRANSMITTING LAYERED CONTENTS TO MOBILE TERMINALS AND VIA A RADIO INFRASTRUCTURE WITH ACCESS PROCEDURE OF TDM/TDMA/OFDMA TYPE, AND ASSOCIATED PROCESSING DEVICE

The invention pertains to the transmission of so-called "layered" content by wave-based transmission infrastructures using an access method relying on time division (at least) multiplexing Here, the term "layered multimedia content" refers to a set of data arranged in scalability layers, typically comprising a so-called base layer and one or more so-called enhancement layers that complement the base layer. The base layer comprises all of the data of a piece of multimedia content that will enable a receiving equipment to reproduce that multimedia content with the lowest possible quality (or definition or resolution). Each enhancement layer comprises another set of data of said multimedia content that will enable said communication terminal to complete the base layer's set of data in order to reproduce the multimedia content with an enhanced quality (or definition or resolution). According to certain layer-based encoding methods, the various layers are hierarchically linked to one another, so that the nth enhancement layer of a piece of multimedia content can only be used if the base layer and the previous n−1 enhancement layers of that piece of multimedia content (associated with lower qualities (or definitions or resolutions)) have been used. According to other methods, only one hierarchy between the base layer and the enhancement layer(s) exist, so that the nth enhancement layer of a piece of multimedia content will improve the content's quality (for example, increasing the number of pixels in an image, increasing the image quality and/or increasing the images' refresh rate) as decoded based on the base layer without it being necessary to have first used any one of the previous n−1 layers. A piece of multimedia content thereby encoded into layers may, for example, be a television or radio program, or an audio or video file.

Furthermore, the term "wave-based transmission infrastructure using an access method relying on time division (at least) multiplexing" refers to any infrastructure within which content is transmitted mono directionally or bidirectionally by waves using one or more access methods based on TDM or TDMA ("Time Division Multiplexing or Time Division Multiple Access") or TDMA/OFDM ("TDM/Orthogonal Frequency Division Multiplexing") time division multiplexing, or based on OFDMA ("Orthogonal Frequency Division Multiple Access") time and frequency division multiplexing. Consequently, it may be either a radio communication network or a wave broadcasting network.

As a reminder, a TDM access method consists of a time-division multiplexing of services, and therefore multiple users may access the same service at the same time, while a TDMA access method consists of a time-division multiplexing of content intended for different users, each piece of content potentially corresponding to one or more services.

Additionally, the term "broadcast network" here refers to any TDM, TDMA or OFDMA infrastructure for broadcasting by waves, whether terrestrial or satellite-based, capable of transmitting content by waves along an outbound (or inbound) mono-directional channel to mobile (or cellular) or portable mobile communication terminals.

Furthermore, the term "communication network" refers to any type of TDMA bidirectional communication infrastructure, which is broadband, wireless, and particularly capable of broadcasting content by waves to terminals, in "broadcast" and/or "multicast" (point-to-multipoint) and/or "unicast" (point-to-point) mode.

Consequently, a TDM, TDMA or TDM/OFDM infrastructure may be wireless network such as a TDM multiplexed broadcast network (such as, for example, a terrestrial DVB-H network (for "Digital Video Broadcasting—Handhelds"—mobile television)), a TDM (for example, DVB-S2) or TDMA (for example, DVB-RCS) multiplexed satellite-based network, or hybrid network, meaning one that is both satellite-based and terrestrial, using TDM multiplexing (such as a DVB-SH (or DVB-SSP) network (satellite links with terrestrial relays))), a cellular (or mobile) TDMA multiplexed network (such as, for example, a GSM/EDGE network), a wireless local area network or WLAN (such as, for example, a Wi-Fi network), or a metropolitan area network or MAN (such as, for example, a WiMAX network (in the modulation modes known as single-carrier and multicarrier)).

Finally, the term "communication terminal" refers to any mobile (or portable or cellular) communication equipment capable at least of receiving layered content from a TDM/TDMA/OFDMA-access radio infrastructure. Consequently, it may be a mobile (or cellular) telephone, a portable computer, a personal digital assistant (or PDA), a layered content receiver (for example, a decoder, a residential gateway) or a STB (Set-Top Box)), provided that it is equipped with radio- or satellite-based means of communication capable of receiving layered content.

As is known to a person skilled in the art, in some TDM-, TDMA- or OFDMA-access wave transmission infrastructure, it is possible to assign to the various complementary (basic and enhancement) layers, which constitute a piece of content from a channel or IP range, different transmission time slices, and to break these layers down into portions in order to transmit them (generally in bursts) to (communication) terminals during the time slices that are respectively associated with them. Here, the term (channel) refers to a television or radio channel, or a video broadcaster.

Whenever the user of a (communication) terminal wishes to receive the content of a given channel (or IP range), it selects that channel with its terminal, and that terminal only activates its receiver during the time slices that were assigned the various layers of the selected channel. During the time slices assigned to the other, non-selected channels, the receiver is placed in idle mode, thereby making it possible to save processing (or CPU) capacity and energy (which is advantageous for a battery-equipped mobile or portable terminal).

Most of the TDM, TDMA or OFDMA (radio) infrastructures comprise a so-called "non-uniform radio coverage" radio access network, meaning that the reception quality (or radio connection quality) within it varies depending on one's position within its radio coverage area. As reminder, the reception quality (or radio connection quality) is quantifiable by means of parameters, such as the CIR (for "Carrier to Interference Ratio"—the ratio between the power of the received signal and the sum of the powers of the receiver's internal noise and the interference noise caused by the environment) or the BER ("Bit Error Rate"—the error rate in the bits received), or the PER (for "Packet Error Rate"—the rate of incorrect packets received).

In the presence of such discontinuities in reception quality, the radio coverage area comprises subareas whose reception quality levels differ. Consequently, the users, whose terminals are located in a subarea that enjoys good radio conditions, may receive the data packets from all the complementary layers of the selected channel's content, during the time slices associated with that channel's layers, and thereby have optimal-quality content. On the other hand, the users whose terminals experience poor radio conditions, can only receive data packets from the base layer of the selected channel's content, and therefore have lower-quality content. This results from the fact that transmitting the data packets of the enhancement layers is (much) more sensitive to radio conditions than transmitting the data packets of the base layer.

If different transmission time slices are assigned to different complementary layers of a selected channel's content, whenever a terminal experiences for radio conditions, and therefore can only correctly receive the data packets from the base layer of a selected channel's content, it continues to be activated during each time slice that is associated with one of the enhancement layers of the selected channel's content, even though it cannot correctly receive the packets. In this situation, the terminal can configure itself, but it needlessly consumes processing (CPU) capacity and energy, which is a downside when it is equipped with a battery.

It is therefore a purpose of the invention to remedy the aforementioned drawback within a TDM-, TDMA- or OFDMA-access wave infrastructure comprising a radio access network with non-uniform coverage.

To that end, it proposes a method devoted to the transmission, via a wave-based transmission infrastructure using an access method relying on multiplexing that is at least time division multiplexing, of content from at least one channel, each piece of content being arranged into one base data layer and at least one enhancement data layer, respectively associated with different transmission time slices, and broken down into portions transmitted during the time slices respectively associated with their layers.

This method comprises:
i) the insertion, in a chosen location of each portion of a base data layer to be transmitted, within a chosen network layer, of at least one learning sequence processed according to a configuration scheme identical to that used to process the enhancement data layer, and
ii) upon receiving a portion of the base data layer of a piece of content, extracting the learning sequence inserted into the chosen network layer, then estimating the reception quality based on that extracted learning sequence, and allowing it to use the next portion of the content's enhancement data layer whenever the estimated quality is above a chosen threshold.

Here, the term "configuration scheme" refers both to protection schemes (coding, interlacing, and like ones) that may be implemented in at least one network layer, and to layout schemes (modulation, and like ones) or transport schemes. Consequently, the term "processing according to a configuration scheme" refers to any processing or mechanism implemented within the network to "configure" a transmitted signal.

The method according to the invention can have other features, and in particular, separately or in combination:
in ii) the reception quality may be estimated by determining the value taken by a quality parameter related to the extracted learning sequence, within a chosen network layer, and this value may be compared to the chosen threshold in order to determine whether the use of the next portion of the content's enhancement data layer can be allowed;
This quality parameter may, for example, be chosen from among (at least) the signal-to-noise ratio (SNR), the CIR ("Carrier to Interference Ratio"), the bit error rate (BER) among received bits, the frame error rate (FER) among received errors, the received signal's power, the CRC ("Cyclic Redundancy Check"), the packet error rate (PER) among received packets, and the video perception quality;
in the presence of a piece of content's enhancement data layers processed according to different configuration schemes, i) in at least one chosen location of each portion of the base data layer to be transmitted, within a chosen network layer, learning sequences may be inserted that are respectively processed according to the configuration schemes that are used to process the content's enhancement data layers, and ii) upon receiving a portion of that content's base data layer, the learning sequences inserted into a chosen network layer may be extracted, and then the respective reception qualities of the enhancement data layers may be estimated based on the extracted learning sequences, and the use of the next portion of the content's enhancement data layer may be allowed whenever the corresponding estimated quality is above a chosen threshold associated with that enhancement data layer;
in one variant, in the presence of multiple enhancement data layers of a piece of content that are processed according to the same configuration scheme, the reception quality may be estimated based on the extracted learning sequence, and the use of the next portion of each of the content's enhancement data layers may be allowed whenever the estimated quality is above a chosen threshold;
the learning sequence may be inserted into a network layer that is chosen from among the physical layer, the MAC layer, the transport layer, and the application layer. For example, the learning sequence may be inserted into the physical layer;
the chosen location for inserting a learning sequence may, for example, be the end of the portion of a base data layer.

The invention also proposes a device for a wave-based transmission infrastructure using an access method relying on multiplexing that is at least time division multiplexing, to process content from at least one channel, each piece of content being arranged into a base data layer and at least one enhancement data layer respectfully associated with different transmission time slices, and intended to be broken down into portions that must be transmitted during the time slices respectively associated with their layers.

This processing device is tasked, when portions of base and enhancement data layers of a piece of content to be transmitted are received, of inserting into a chosen location of each portion of the base data layer, within a chosen network layer, at least one learning sequence processed according to a configuration scheme identical to the one that is used to process the enhancement data layer.

The inventive device may comprise other characteristics, which may be taken separately or in combination, in particular:
it may be tasked, in the event that a piece of content is received comprising enhancement data layers processed according to different configuration schemes, of inserting in at least one chosen location of each portion of the base data layer to be transmitted, within a chosen network layer, learning sequences respectively processed according to the configuration schemes used to process the content's enhancement data layers;
it may be tasked with inserting the learning sequence within a network layer that is chosen from among the physical layer, the MAC layer, the transport layer, and the application layer;

it may be tasked with inserting the learning sequence into a location that is found at the end of the portion of a base data layer.

The invention also proposes a communication terminal comprising:

a player capable of using content from at least one channel, and a receiver capable of receiving from a wave-based transmission infrastructure using an access method relying on multiplexing that is at least time division multiplexing, content from at least one channel in the form of portions of a base data layer and at least one enhancement data layer respectively associated with different transmission time slices, and tasked with decoding the portions of received content in order to reconstruct each piece of content to feed the player, activation means tasked, when a channel is selected, with activating the receiver during each time slice associated with each base data layer of the selected channel's content, and processing means tasked with extracting from each portion of the content's base data layer (received by the receiver), within a chosen network layer, an inserted learning sequence, processed according to a configuration scheme identical to the one that is used to process the enhancement data layer, then estimating the reception quality based on that extracted learning sequence, and ordering the activation means to activate the receiver during the next time slice that is associated with the enhancement data layer of the selected channel's content whenever the estimated quality is above a chosen threshold, in order for it to use the next portion of the received enhancement data layer as a complement to the portion from the base data layer in view of reconstructing their content.

The inventive terminal may comprise other characteristics, which may be taken separately or in combination, in particular:

its processing means may be tasked with estimating the reception quality by determining the value taken by a quality parameter related to the extracted learning sequence, within a chosen network layer, and with comparing that value to the chosen threshold in order to determine whether they can allow the activation means to activate the receiver during the next time slice which is associated with the enhancement data layer of the selected channel's content;

its processing means may be tasked, in the presence of enhancement data layers of a piece of content that are processed according to different configuration schemes, of extracting from each portion of a piece of content's base data layer, within a chosen network layer, inserted learning sequences, respectively processed according to the configuration schemes used to process the content's enhancement data layers, then estimating the respective reception qualities of the enhancement data layers based on the extracted learning sequences, and of ordering the activation means to activate the receiver during the next time slice that is associated with an enhancement data layer of the selected channel's content whenever the corresponding estimated quality is above a chosen threshold, in order for it to use the next received portion of that enhancement data layer as a complement to the portion from the base data layer in view of reconstructing their content;

in one variant, its processing means may be tasked, in the presence of multiple enhancement data layers of a piece of content that are processed according to the same configuration scheme with estimating the reception quality based on the extracted learning sequence, and with ordering the activation means to activate the receiver during the next time slice associated with each enhancement data layer of the selected channel's content whenever the estimated quality is above an associated chosen threshold, in order for it to use the next portion received from each enhancement data layer as a complement to the portion from the base data layer in view of reconstructing their content.

The information is particularly well-suited, although not exclusively so, to DVB-H, DVB-SH (or DVB-SSP) and WiMAX networks.

Other characteristics and advantages of the invention will become apparent upon examining the detailed description below, and the attached drawings, wherein.

The appended drawings constitute part of the description of the invention as well as contributing to the definition of the invention, if necessary.

It is an object of the invention to propose a layered content transmission mode, via a wave-based transmission infrastructure using an access method relying on TDM, TDMA or OFDMA multiplexing and comprising an access network with a nonuniform coverage area, making it possible to limit through self-configuration the processing capacity that is used and the energy consumed by the mobile (or portable) communication terminals whenever they are located within a subarea that does not enjoy good radio conditions.

In what follows, is considered by way of nonlimiting example that the transmission infrastructure is a DVB-H (for "Digital Video Broadcasting—Handhelds"—mobile television) radio communication network using an access method relying on TDM multiplexing. However, the invention is not limited to this type of transmission infrastructure. Rather, it pertains to any type of infrastructure capable of ensuring the wave-based monodirectional or bidirectional transmission of content (potentially multimedia content) by means of an access method relying on TDM, TDMA or OFDMA multiplexing, whether it is a monodirectional broadcast network (that is terrestrial and/or satellite-based) or a bidirectional, broadband, wireless communication network. Consequently, it may also be a cellular (or mobile) GSM/EDGE, network, a wireless local area network or WLAN (such as, for example, a Wi-Fi network), a metropolitan area network or MAN (such as, for example, a WiMAX network (in the modulation modes known as self-carrier and multi-carrier)), of a terrestrial network implementing a technology derived from a satellite technology (such as, for example, DVB-S, DVB-S2 or DVB-RCS), or a hybrid network, such as a DVB-SH (or DVB-SSP) network, or an access method infrastructure relying on OFDMA multiplexing.

Furthermore, it is assumed in what follows, by way of a nonlimiting example, that the radio communication terminals (TC) are mobile (or cellular) telephones or personal digital assistants (or PDAs). However, the invention is not limited to this type of radio communication terminal. Rather, it pertains to any type of mobile (or portable or cellular) communication equipment capable at least of receiving content in layers by means of waves via a TDM or TDMA or OFDMA transmission infrastructure. Consequently, it may also be a desktop or portable computer, a multimedia content receiver (such as, for example, a residential gateway) or an STB ("Set-Top Box")), provided that it is equipped with means of wave-based (radio or satellite-based) communication capable at least of receiving data.

Furthermore, it is assumed in what follows, by way of a nonlimiting example, that the layered content, broadcast towards the terminals (TC), is multimedia content data such as videos. However, the invention is not limited to this type of layered content. Rather, it pertains to any type of layered content, and particularly television or radio programs and audio content.

Figure 1:
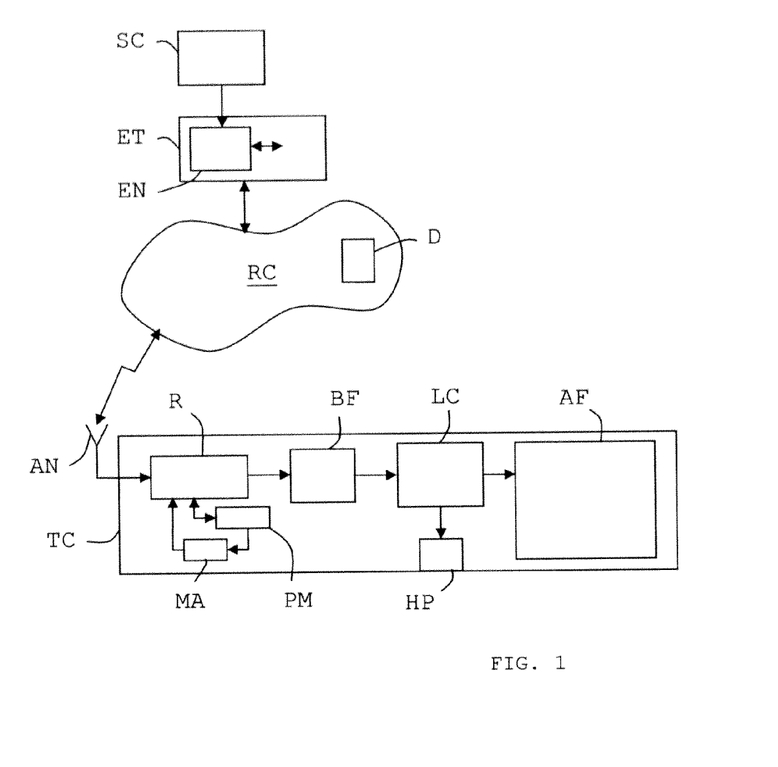
FIG. 1 very schematically and functionally depicts a TDM transmission infrastructure, to which an example embodiment of an inventive communication terminal and a transmission equipment having an inventive processing device are connected.

As is schematically depicted in FIG. 1, the implementation of the invention requires the presence of at least one equipment for transmitting layer content ET, at least one processing device D, at least one (communication) terminal TC, and at least one (wave-based) TDM or TDMA or OFDMA transmission infrastructure RC.

In what follows, it is assumed by way of a nonlimiting example that the content (here, videos) is arranged in three complementary layers, one being a base layer Bi (i=1 or 2 designating a channel), and the other two being enhancement layers Cij (j=1 or 2) intended to enhance the quality (or definition or resolution) offered by the base layer Bi whenever at least one of them is combined with that layer (Bi). However, the invention is not limited to this number (3) of complementary layers. Rather, this number may be as high as desired, provided that it is at least equal to two (2).

The transmission equipment ET is, for example, an access gateway installed within the network RC, and more specifically, upstream of an input of its radio access network. It intervenes every time that it receives a flow, here a piece of layered video content, potentially in the form of IP packets. The layered content flow may be of any origin. In the nonlimiting example depicted in FIG. 1, the layered video content is provided by a server (or service platform) SC.

As a reminder, a piece of (layered) content must be transmitted within the context of the transmission session, potentially a shared one, to a set of at least one user (or even to all users) present within a coverage area of the network's RC radio access network. Consequently, at the start of a session, and for its entire duration, the radio access network provides each terminal TC located within its coverage area and participating in that session, with a broadcast or point-to-multipoint (or "multicast") content transfer connection and/or a point-to-point (or "unicast") content transfer connection.

For example, the (content) server SC encapsulates the data from the layers of each piece of content into RTP/UDP/IP and transmits them to the transmission equipment ET in the form of a flow of data packets in accordance with the transport protocol RTP (for "Real-time Transmission Protocol"), which multiplexes them.

For example, the transmission equipment ET receives video flows with three (complementary) layers Bi and Cij associated with two different CAi channels (i=1 or 2). The invention is not limited to these numbers of layers and channels. As indicated above, the number of complementary layers may actually be as large as desired (within the transmission capacity limit of the network RC). In addition, the invention applies as soon as contents of at least one channel must be transmitted (transported).

The transmission equipment ET here comprises (by way of a nonlimiting example) a separator EN tasked, whenever it receives a data packet flow of a piece of layer content, with separating (demultiplexing) the packets as a function of the layers to which they belong. This layer Bi and Cij of a piece of content from a channel CAi is thereby "broken down into portions" (for example, into IP packets), in the separator EN adds a tag to each portion representative of the layer to which it belongs.

It is important to note that each layer Bi or Cij of a piece of content from a channel CAi is processed according to a configuration scheme (for example, a coding and modulation scheme whenever the processing is carried out within the physical layer (PHY)). This processing is carried out either on each packet (header and payload), or only on each packet's header. Generally, the configuration diagram that protects the base data layer Bi is not the same as the one that protects the enhancement data layer(s) Cij of the same piece of content. This is referred to as "unequal data processing". Furthermore, the enhancement data layers Cij are generally processed according to the same configuration scheme. However, this is not mandatory.

A layer Bi or Cij is processed within a network layer (of the OSI model) chosen from among the physical layer PHY, the media access control or MAC layer, the transport layer, and the application layer. Consequently, the equipment or element in which the processing is carried out according to a configuration scheme depends on the layer within which that processing is carried out. For example, if insertion is carried out within the physical layer (PHY), according to a modulation and coding scheme, or the MAC layer, it is performed by a base station SB, and it is done within the IP or transport layer, in which case it is being performed within the equipment or element concerned by the processing of that layer.

Each layer Bi and Cij of a piece of content from a channel CAi is associated with a dedicated transmission time slice Tik (k designates the layers, here k=1 to 3), and therefore each portion of a layer Bi or Cij must be transmitted during the time slice Tik that is associated with it. In other words, Ni time slices Tik are associated with each channel CAi, Ni here being the number of complementary layers Bi and Cij constituting the content from a channel CAi. It should be understood that the number Ni of complementary channels may potentially vary from one channel to another, but it may also be the same for all the channels CAi.

The processing device D is tasked with inserting at a chosen location in each portion of the base data layer Bi of a piece of content from a channel CAi, within a chosen network layer, a predetermined learning sequence SA that is processed according to a configuration scheme identical to the one that is used to process at least one of the enhancement data layers Cij.

This insertion may be carried out within a network layer (OSI model) chosen from the physical layer (PHY), the MAC layer, the transport layer, and the application layer. It should therefore be understood that the processing device D may be installed in different locations depending on the network layer into which it is to perform its insertion. Thus, if the learning sequence is inserted into the application layer, the device D may be installed in a service platform connected to the content server SC, or even within that server. If the learning sequence is inserted into the transport layer, the processing device D may be installed in the network core of the network RC. If the learning sequence is inserted into the PHY or MAC layer, the processing device D may be installed into the base station of a radio access network of the network RC, as is the case in the nonlimiting example depicted in FIG. 1.

It should be noted that the processing device D uses the tags that were added by the separator EN in order to detect the portions of the base layer Bi within which it must insert a learning sequence SA.

It should also be noted that it is not necessary that the insertion of a learning sequence SA take place within the same network layer as the one in which the protection by a configuration scheme takes place. The final extraction, however, is facilitated when the insertion of a learning sequence SA is carried out within the same network layer as the one in which the protection by a configuration scheme takes place.

It should also be noted that the insertion of a learning sequence SA may be carried out in any location of a portion of a base data layer Bi. However, it is advantageous to do it at the end of a portion, because the symbols contained in that location are the ones which are transmitted last, and therefore which are temporally the closest to the symbols contained within the portion of the following enhancement data layer Cij, and consequently the ones most representative of the radio transmission conditions.

It should also be noted that whenever the enhancement data layers Cij of a piece of content are processed according to different configuration schemes, the processing device D may be tasked with inserting into at least one chosen location of each portion of the base data layer Bi of that same content, within a chosen network layer, learning sequences SAj respectively processed according to the configuration schemes that protect these enhancement data layers Cij.

Once the processing device D has performed one (for more) learning sequence insertion(s) SA into a portion of the base data layer Bi of a piece of content, it transmits that portion to the network RC so that they can be transmitted to the terminals TC during the time slices Tik that are respectively associated with said layers Bi and Cij.

Figure 2:
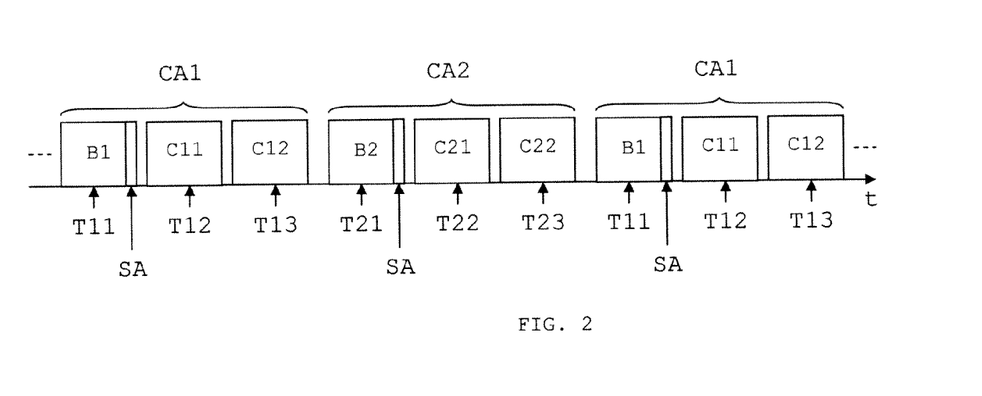
FIG. 2 is a time diagram (t) representing an example trio of time slices associated with three complementary layers of content from two different channels.

FIG. 2 schematically depicts an example temporal diagram of transmission (t) by the network RC of portions of three complementary layers Bi (i=1 or 2) and Cij (j=1 or 2) of two video channels CAi during the temporal slices Tik which are respectively associated with said complementary layers Bi and Cij. More specifically:

- a portion of the base layer B1 of a video from the first channel CA1 is transmitted (for example, in a burst) during the first time slice T11 of the first channel CA1,
- a portion of the first enhancement layer C11 of that same video from the first channel CA1 is transmitted (for example, in a burst) during the second time slice T12 of the first channel CA1,
- a portion of the second enhancement layer C12 of that same video from the first channel CA1 is transmitted (for example, in a burst) during the third time slice T13 of the first channel CA1,
- a portion of the base layer B2 of a video from the second channel CA2 is transmitted (for example, in a burst) during the third time slice T21 of the second channel CA2,
- a portion of the first enhancement layer C21 of that same video from the second channel CA2 is transmitted (for example, in a burst) during the second time slice T22 of the second channel CA2,
- a portion of the second enhancement layer C22 of that same video from the second channel CA2 is transmitted (for example, in a burst) during the third time slice T23 of the second channel CA2,
- another portion of the base layer B1 of a video (potentially the same one as that of the preceding portion) from the first panel CA1 is transmitted (for example, in a burst) during another first-time slice T11 of the first channel CA1,
- another portion of the enhancement channel C12 of that same video from the first channel CA1 is transmitted (for example, in a burst) during another second time slice T12 of the first channel CA1,
- another portion of the second enhancement layer C12 of that same video from the first channel CA1 is transmitted (for example, in a burst) during another third time slice T13 of the first channel CA1, and so on.

It is important to note that the time slice(s) that are associated with a channel CAi (and more precisely, with the various complementary channels Bi and Cij of its content) are not necessarily contiguous (as is the case in the nonlimiting temporal diagram depicted in FIG. 2). The various complementary layers Bi and Cij of the different channels CAi may in fact be interlaced.

It is also important to note that the transmission period of the bursts that may contain the portions (or packets) of complementary layers (Bi and Cij) is not necessarily the same for all of the complementary layers Bi and Cij and for all of the channels CAi.

In order to be able to receive from the network RC (and potentially transmit) layer content into which one or more learning sequences SA have been inserted, the (communication) terminals TC comprise at least:

- a receiver R coupled with an antenna AN and tasked with receiving from the network RC, when it is activated, (bursts of) portions (or packets) of the base data layer Bi and enhancement data layer(s) Cij of content from at least one channel CAi and respectively associated with different time slices Tik and with delivering data packets from complementary layers Bi and Cij. It particularly contains the states processing the various network layers (PHY, MAC, IP, transport),
- potentially a buffer memory BF, potentially forming part of the receiver R, and tasked with temporarily storing the packets delivered by the receiver R, then with delivering these stored packets to an output,
- a content player LC tasked with using the packets from the delivered complementary layers (potentially, delivered by the buffer BF) in order to display and/or broadcast the content that they constitute, and
- a display AF, such as, for example, a screen, tasked with displaying images and content delivered by the content player LC, and/or at least one speaker HP, tasked with broadcasting the sounds of the content delivered by the content player LC.

According to the invention, each terminal TC also comprises an activation module MA and a processing module MT.

The activation module MA is tasked, whenever a channel CAi has been selected within its terminal TC, with activating the receiver R during each time slice Ti1 (with the same index i) that was associated with the base data layer Bi of the content from the selected channel CAi.

Here, the term "activate" refers to allowing the feeding, and therefore the operation, of the receiver R for d interval of time greater than or equal to the duration of a time slice Ti1.

In order to be able to perform these activations at precise moments, the activation module MA must not only use the information that is representative of the temporal positions of the time slices Tik and their association with the various complementary layers Bi and Cij of the content from different channels CAi, but also be roughly synchronized to a clock of the network RC. This synchronization may, for example, be carried out by periodically transmitting a signaling message comprising a piece of synchronization information to the terminals TC. Furthermore, the temporal and association information is transmitted to the terminals TC, via the network RC, within signaling messages. For example, a signaling message may contain the start time of a first place T11, the duration of the time interval between the start of the two successive time slices Tik and T(i+1)k or Ti(k+1), the number of time slices Tik and the matches between the time slices Tik and the associated complementary layers.

It should be noted that the formation of each learning sequence SA, the location chosen for inserting the learning sequence(s) SA and the network layer within which this insertion is carried out may be indicated each terminal TC by means of a signaling message. In one variant, each terminal TC may be preconfigured so that it is possible to tell where the sequence(s) is/are systematically inserted.

These signaling messages are, for example, generated by the transmission equipment ET or by the device D.

By way of example and with reference to the nonlimiting example depicted in FIG. 2, if the first channel CA1 was selected, the activation module MA will activate the receiver R right before the start of each first time slice T11 of the first channel CA1 and deactivate the receiver R right after the end of each first time slice T11 of the first channel CA1.

The processing module MT is first in charge of extracting from each portion of the base data layer Bi of a piece of content, received by the receiver R during the corresponding time slice Ti1, within a chosen network layer, each learning sequence SA previously inserted by the processing device D.

It is important to note that the network layer within which the processing module MT is performing the extraction of a learning sequence SA is not necessarily the same as the one within which that learning sequence SA was inserted. However, for reasons of complexity, it is preferable for the insertion and extraction to be carried out within the same network layer, for example the physical layer (PHY).

The processing module MT is also tasked with estimating the current reception quality of its terminal TC based on the extracted learning sequence, in order to determine whether the enhancement packets Cij have a high probability of being correctly received. To do so, it compares the estimated reception quality to a chosen threshold, and whenever the estimated quality is above a chosen threshold, it allows the use of the portion of at least one enhancement data layer Cij of the content in question. It should be noted that in the event that multiple learning sequences SAj associated with different enhancement layers Cij of a piece of content are being extracted, the processing module MT estimates reception qualities of its terminal TC based on the different learning sequences SAj extracted, in order to determine whether the packets of at least one of the enhancement layers Cij have a high probability of incorrectly received.

For example, the processing module MT estimates a current reception quality by determining the value assumed by a quality parameter (or metric) related to the learning sequence SA that is being extracted from a chosen network layer, then by comparing that value to a chosen threshold.

The quality parameter (or metric) is, for example, chosen from among at least the signal-to-noise ratio or SNR ("Signal to Noise Ratio"), the ratio between the power of the received signal and the sum of the powers of the receiver's internal noise and the interference noise caused by the environment, or CIR (for "Carrier to Interference Ratio"), the received bit error rate, or BER ("Bit Error Rate"), the frame error rate or FER among received frames, the power of the received signal, the CRC ("Cyclic Redundancy Check"), the packet error rate or PER among received packets, and the video perception quality. In fact, the quality parameter that is chosen depends on the network layer from which the processing module MT is extracting a learning sequence SA.

For example, if the extraction is being carried out from the MAC layer, then CRC, BER, or FER may, for example, be used. For example, if the extraction is being carried out from the physical layer (PHY), then SNR, CIR, BER, or received signal power may be used. For example, if the extraction is being carried out from the transport layer or application layer, then CRC or video perception quality may, for example, be used.

Any technique known to the person skilled in the art, intended to determine the value taken by a quality parameter (or metric) based on data received by terminal TC may be used.

The processing module MT compares the value of the chosen quality parameter (or metric) at the chosen threshold. If the estimated reception quality is represented by a parameter whose value must be as high as possible (for example, received power or CIR), then the processing module MT allows the activation module MA to activate the receiver R during the next time slice(s) Tik associated with the enhancement data layer(s) Cij of the content from the selected channel, whenever the value is above the chosen threshold. It is assumed that the next packets of at least one of the enhancement layers Cij has a high probability of being correctly received, and therefore sends activation instructions to the activation module MA. Otherwise, it does not send any activation instructions to the activation module MA.

If the estimated reception quality is represented by a parameter whose value must be as low as possible (for example, BER), then the processing module MT allows the activation module MA to activate the receiver R during the next time slice(s) Tik associated with the enhancement data layer(s) Cij of the content from the selected channel, whenever the value is below the chosen threshold. It is assumed that the next packets of at least one of the enhancement layers Cij has a high probability of being correctly received, and therefore sends activation instructions to the activation module MA. Otherwise, it does not send any activation instructions to the activation module MA.

Whenever the activation module MA receives activation instructions designating one or more enhancement data layers Cij, it activates the receiver R during each next time slice Tik which is associated with each designated enhancement data layer.

By way of example and with reference to the nonlimiting example depicted in FIG. 2, if the second channel CA2 was selected and the reception quality is estimated to be good enough after the portion of the base data layer B2 is received during the first time slice T21 of the second channel CA2, the activation module MA will activate the receiver R right before the start of the second time slice T22 of the second channel CA2, which follows its first time slice T21, and deactivate the receiver R right after the end of that second time slice T22 of the second channel CA2, and then it will activate the receiver R right before the start of the third time slice T23 of the second channel CA2, which follows the second time slice T22, and deactivate the receiver R right after the end of that third time slice T23 of the second channel CA2.

Thus, the receiver R may receive and process the portions of the enhancement data layers Cij that it receives during the associated time slice(s) Tik. More precisely, the receiver R can decode the received portions and reconstruct the decoded data packets belonging to the base data layer Bi and to the enhancement data layer(s) Cij in order to gradually reconstruct their content in the quality offered by combining them.

It should be noted that in one variant, whenever a piece of content is defined by a base data layer Bi and multiple enhancement data layers Cij processed according to the same configuration scheme, the processing module MT extracts from each portion of the base data layer Bi of that content, within a chosen network layer, the inserted learning sequence SAj, which is processed according to the configuration scheme. Next, it estimates a reception quality for all of the enhancement data layers Cij based on the extracted learning sequence SAj. It may then compare the estimated reception quality to multiple chosen thresholds respectively associated with the various enhancement data layers Cij, and order the activation module MA to activate the receiver R during the next time slice Tik which is associated with an enhancement data layer Cij of the content from the selected channel CAi whenever the estimated reception quality is above the chosen threshold associated with that layer Cij, in order to enable the receiver R to use the next received portion of that enhancement data layer Cij as a complement to the portion of the base data layer Bi, in view of reconstructing their content. It should be understood that the reception quality may be estimated to be above the threshold associated with one of the enhancement data layers Cij but below the threshold associated with another enhancement data layer Cij.

It should also be noted that whenever a piece of content is defined by a base data layer Bi and multiple enhancement data layers Cij processed according to different configuration schemes, the processing module MT extracts from each portion of the base data layer Bi of that content, within a chosen network layer, all of the inserted learning sequences SAj, which are respectively processed according to the different configuration schemes. Next, estimate the respective reception qualities for the various enhancement data layers Cij based on the corresponding extracted learning sequences SAj. It may then order the activation model MA to activate the receiver R during the next time slice Tik which is associated with an enhancement data layer Cij of the content from the selected channel CAi whenever the corresponding estimated reception quality is above a chosen threshold, in order to enable the receiver R to use the next received portion of that enhancement data layer Cij as a complement to the portion of the base data layer Bi in order to reconstruct their content. It should be understood that the estimated reception quality corresponding to one of the enhancement data layers Cij may be estimated to be above one associated chosen threshold, while the reception quality of another enhancement data layer Cij' may be estimated to be below (another) associated chosen threshold. Likewise, the estimated reception quality as corresponding to the various enhancement data layers Cij may all be estimated to be above their respective thresholds.

As the receiver R is only activated to receive the portions of the base data layer Bi when the enhancement data packets Cij have a high probability of being correctly received, it is therefore possible to save on processing capacity and energy within its terminal TC.

The processing device D and/or the activation module MA and/or the processing module MT may be constructed in the form of electronic circuits, software (or computer) modules, or a combination of circuits and software.

It is important to note that the invention may also be considered from the perspective of a method for transmitting content that may particularly be implemented by means of the radio network RC, the processing device D, the transmission equipment ET and the communication terminal TC presented above. Since the features offered by the implementation of the inventive method are identical to the ones offered by the network elements and equipment (particularly the processing device D and the communication terminal TC) presented above, only the combination of main features offered by the method is presented above.

This content transmission method comprises:
i) the insertion, in a chosen location of each portion to be transmitted of a base data layer Bi, within a chosen network layer, of at least one learning sequence SA processed according to a configuration scheme identical to the one used to process at least one of the enhancement data layers Cij, and
ii) upon receiving a portion of a base data layer Bi of a piece of content, extracting the inserted learning sequence SA from a chosen network layer, then estimating the reception quality based on that extracted learning sequence SA, and allowing it to use the portion of the content's enhancement data layer Cij whenever the estimated quality is above a chosen threshold.

The invention is not limited to the embodiments of the processing device, communication terminal, and method described above, which are only given by way of example; rather, it encompasses all variants that a person skilled in the art may envision within the framework of the claims below.

The invention claimed is:

1. A method for transmitting, via a wave-based transmission infrastructure using an access method relying on multiplexing that is at least time division multiplexing of content from at least one channel, each piece of content being arranged into one base data layer and at least one enhancement data layer, respectively associated with different transmission time slices, and broken down into portions transmitted during the time slices respectively associated with their layers, the method comprising:
  inserting, in a chosen location of each portion of a base data layer to be transmitted, within a chosen network layer, at least one learning sequence processed according to a configuration scheme identical to that used to process the enhancement data layer, wherein the formation of each learning sequence, the locations chosen for inserting the learning sequence, and the network layer within which the insertion is carried out, are indicated through a signaling message and
  extracting, upon receipt of a base data layer portion of a piece of content, the learning sequence inserted into a chosen network layer, then estimating the reception quality based on that extracted learning sequence, and allowing it to use the next portion of the enhancement data layer of the content whenever the estimated quality is above a chosen threshold.

2. The method according to claim 1, further comprising:
  estimating reception quality by determining the value taken by a quality parameter related to the extracted learning sequence, within a chosen network layer; and
  determining whether use of the next portion of the enhancement data layer of the content will be allowed by comparing the estimated reception quality to the chosen threshold.

3. The method according to claim 2, further comprising choosing the quality parameter from at least the signal-to-noise ratio (SNR), the carrier-to-interference ratio (CIR), the bit error rate (BER) among received bits, the frame error rate (FER) among received errors, the power of the received signal, the cyclic redundancy check (CRC), the packet error rate (PER) among received packets, and the video perception quality.

4. The method according to claim 3, wherein the method is performed in the presence of enhancement data layers of a piece of content that are processed according to different configuration schemes.

5. The method according to claim 3, wherein in the presence of multiple enhancement data layers of a piece of content that are processed according to the same configuration scheme, the reception quality is estimated based on the extracted learning sequence, and the use of the next portion of each of the enhancement data layers of the content may be allowed whenever the estimated quality is above a chosen threshold.

6. The method according to claim 5, wherein the learning sequence is inserted into a network layer chosen from a group comprising the physical layer, the MAC layer, the transport layer, and the application layer.

7. The method according to claim 6, wherein the learning sequence is inserted within the physical layer.

8. The method according to claim 7, wherein the chosen location for inserting a learning sequence is the end of the portion of a base data layer.

9. A processor for transmitting, via a wave-based transmission infrastructure using an access method relying on multiplexing that is at least time division multiplexing, of content from at least one channel, each piece of content being arranged into one base data layer and at least one enhancement data layer, respectively associated with different transmission time slices, and broken down into portions transmitted during the time slices respectively associated with their layers, the processor being operative, when portions of base and enhancement data layers of a piece of content to be transmitted are received, to:

insert into a chosen location of each portion of the base data layer, within a chosen network layer, at least one learning sequence processed according to a configuration scheme identical to the one that is used to process the enhancement data layer, and wherein the processor is further operative to insert the learning sequence into the network layer chosen from a group comprising the physical layer, the MAC layer, the transport layer, and the application layer, wherein the insertion is based on tags added, by a separator contained in associated transmission equipment, to each portion representative of the layer to which each portion belongs and the processor uses the tags to detect the portions of the base layer within which the processor must insert a learning sequence, and wherein the formation of each learning sequence, the locations chosen for inserting the learning sequence, and the network layer within which the insertion is carried out, are indicated through a signaling message.

10. The processor according to claim 9, additionally operative, in the event that a piece of content is received comprising enhancement data layers processed according to different configuration schemes, to insert in at least one chosen location of each portion of the base data layer to be transmitted, within a chosen network layer, learning sequences respectively processed according to the configuration schemes used to process the enhancement data layers of the content.

11. The processor according to claim 9, additionally operative to insert the learning sequence into the physical layer.

12. The processor according to claim 11, additionally operative to insert the learning sequence in a location found at the end of a portion of a base data layer.

13. A communication terminal, comprising:
a player capable of using content from at least one channel;
a receiver capable of receiving from a wave-based transmission infrastructure using an access method relying on multiplexing that is at least time division multiplexing, content from at least one channel in the form of portions of a base data layer and at least one enhancement data layer respectively associated with different transmission time slices, and tasked with decoding the portions of received content in order to reconstruct each piece of content to feed the player;
an activation module operative, when a channel is selected, to activate the receiver during each time slice associated with each base data layer of the content of the selected channel; and
a processor operative to:
extract from each portion of the base data layer of the content received by the receiver, within a chosen network layer, an inserted learning sequence, processed according to a configuration scheme identical to the one that is used to process the enhancement data layer, wherein the formation of each learning sequence, the locations chosen for inserting the learning sequence, and the network layer within which the insertion is carried out, are indicated through a signaling message, and
estimate the reception quality based on that extracted learning sequence, and to order the activation module to activate the receiver during the next time slice that is associated with the enhancement data layer of the content of the selected channel whenever the estimated quality is above a chosen threshold, in order for it to use the next portion of the received enhancement data layer as a complement to the portion from the base data layer in view of reconstructing their content.

14. The terminal according to claim 13, wherein the processor is operative to estimate the reception quality by determining the value taken by a quality parameter related to the extracted learning sequence, within a chosen network layer, and to compare the value to the chosen threshold in order to determine whether it can allow the activation module to activate the receiver during a next time slice which is associated with the enhancement data layer of the selected channel's content.

15. The terminal according to claim 14, wherein the quality parameter is chosen from at least the signal-to-noise ratio (SNR), the carrier-to-interference ratio (CIR), the bit error rate (BER) among received bits, the frame error rate (FER) among received errors, the received signal's power, the cyclic redundancy check (CRC), the packet error rate (PER) among received packets, and the video perception quality.

16. The terminal according to claim 15, wherein the processor is operative, in the presence of enhancement data layers of a piece of content that are processed according to different configuration schemes, to extract from each portion of a base data layer of a piece of content, within a chosen network layer, inserted learning sequences, respectively processed according to the configuration schemes used to process the enhancement data layers of the content, then to estimate the respective reception qualities of the enhancement data layers based on the extracted learning sequences, and to order the activation module to activate the receiver during the next time slice that is associated with an enhancement data layer of the selected channel's content whenever the corresponding estimated quality is above a chosen threshold, in order for it to use the next received portion of that enhancement data layer as a complement to the portion from the base data layer in view of reconstructing their content.

17. The terminal according to claim 15, wherein the processor is operative, in the presence of multiple enhancement data layers of a piece of content that are processed according to the same configuration scheme, to estimate the reception quality based on the extracted learning sequence, and to order the activation module to activate the receiver during the next time slice associated with each enhancement data layer of the content of the selected channel whenever the estimated quality is above a chosen threshold, in order for it to use the next portion received from each enhancement data layer as a complement to the portion from the base data layer in view of reconstructing their content.

18. A method for transmitting, via a wave-based transmission infrastructure relying on multiplexing that is at least time division multiplexing, content from at least one channel, each piece of content being arranged into one base data layer and at least one enhancement data layer, respectively associated with different transmission time slices and broken down into portions transmitted during the time slices respectively associated with their layers, the method comprising:

inserting, into a chosen location of each portion of a base data layer to be transmitted, within a chosen network layer, at least one learning sequence processed according to a configuration scheme identical to that used to process the enhancement data layer, wherein the formation of each learning sequence, the locations chosen for inserting the learning sequence and the network layer within which the insertion is carried out, are indicated through a signaling message.

19. A method whereby a radio communications terminal processes content received in layers via a wave-based transmission infrastructure, the method comprising:

extracting, upon receipt of a base data layer portion of a piece of content, a learning sequence inserted into a chosen network layer, wherein the formation of each learning sequence, the locations chosen for inserting the learning sequence and the network layer within which the insertion is carried out, are indicated through a signaling message; and estimating the reception quality based on the extracted learning sequence and comparing the estimated quality value to a chosen threshold to determine whether use of the next portion of the enhancement data layer can be allowed.

* * * * *